J. R. BLACK.
COMBINED MULCHING AND LEVELING ATTACHMENT FOR PLOWS.
APPLICATION FILED JAN. 17, 1916.
1,225,399.
Patented May 8, 1917.
2 SHEETS—SHEET 1.
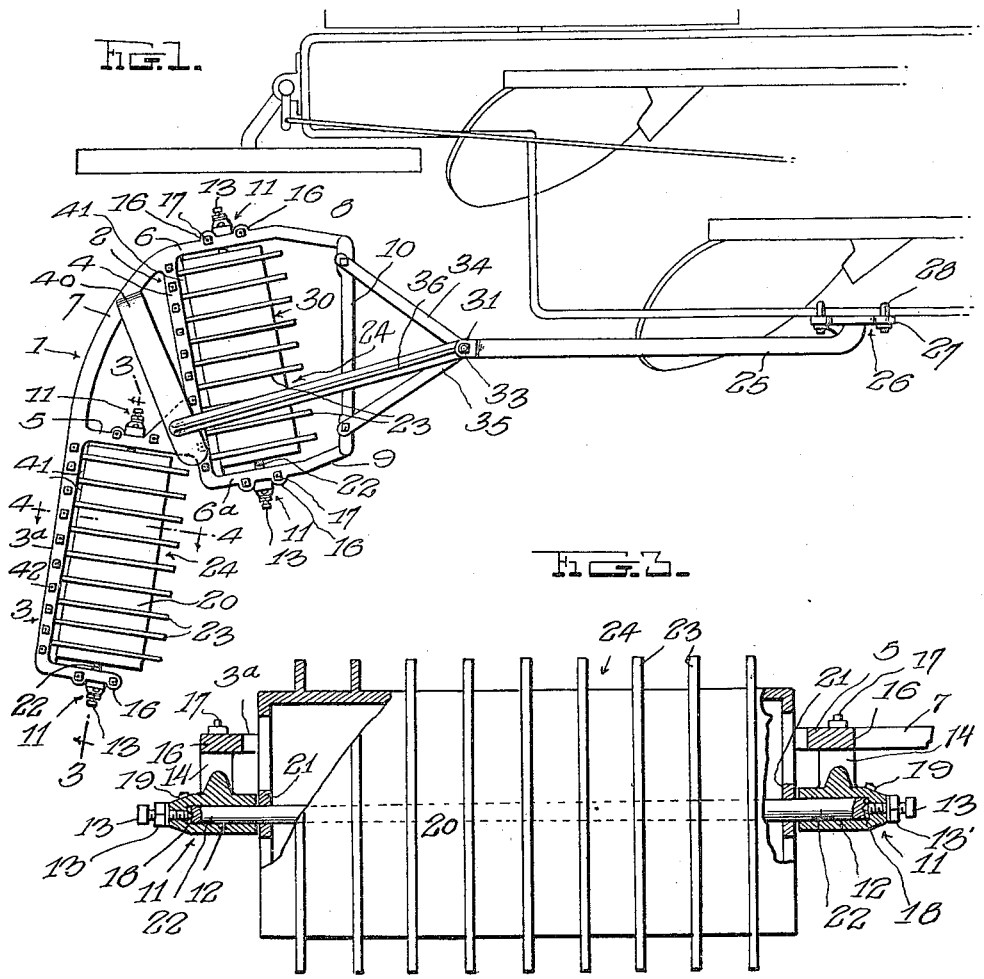
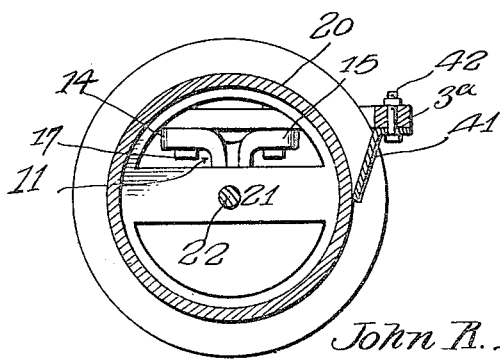
Witness
H. Woodard
Inventor
John R. Black
By [signature]
Attorneys

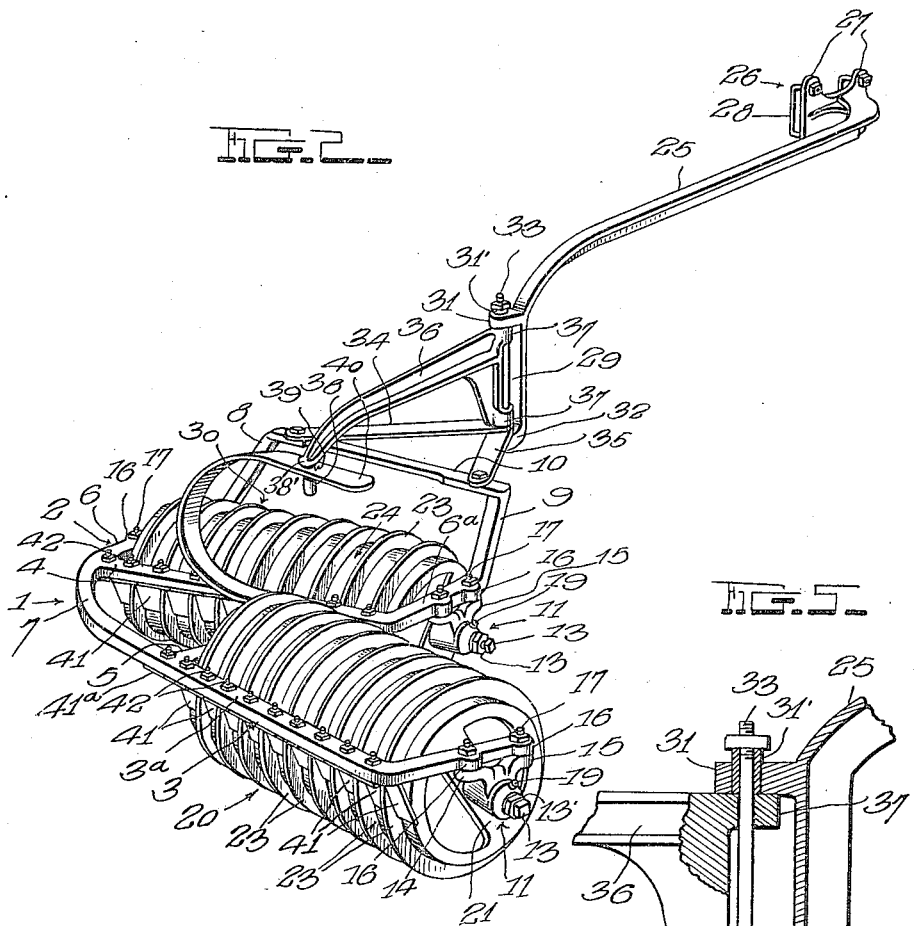

UNITED STATES PATENT OFFICE.

JOHN RANDALL BLACK, OF TOULON, ILLINOIS.

COMBINED MULCHING AND LEVELING ATTACHMENT FOR PLOWS.

1,225,399.

Specification of Letters Patent.

Patented May 8, 1917.

Application filed January 17, 1916. Serial No. 72,583.

*To all whom it may concern:*

Be it known that I, JOHN RANDALL BLACK, a citizen of the United States, residing at Toulon, in the county of Stark and State of Illinois, have invented certain new and useful Improvements in Combined Mulching and Leveling Attachments for Plows; and I do declare the following to be a full, clear, and exact description of the invention, such as will enable others skilled in the art to which it appertains to make and use the same.

This invention relates to improvements in agricultural implements, and more particularly to mulching or pulverizing attachments for plows.

The primary object of the invention is to provide a simply constructed, light and efficient attachment of this character which when applied to a plow will add very little additional burden to the draft animals.

Another object is to provide an attachment of this character equipped with connecting means for attaching it to a plow, which are so constructed as to render the attachment when applied, essentially a part of the plow, and which does not in any way interfere with the earth turned over by the mold boards of the plow.

Another object is to construct the pulverizing drums or cylinders of a device of this character with scraping elements which in addition to performing their function as scrapers or levelers, strengthen the cylinder and provide earth receiving chambers between them for retaining the earth picked up by the scrapers which is ejected therefrom in the form of a mulch composed of small particles.

With these and other objects in view, the invention consists of certain novel features of construction, and the combination and arrangement of parts to be hereinafter more particularly described and claimed.

In the accompanying drawings:

Figure 1 represents a plan view of a portion of a plow equipped with this improved attachment;

Fig. 2 is a perspective view of the attachment detached;

Fig. 3 is an enlarged plan view partly in section of one of the drums or cylinders taken on line 3—3 of Fig. 1 showing the mounting thereof in its separate frame;

Fig. 4 is a transverse section taken on the line 4—4 of Fig. 1;

Fig. 5 is an enlarged detail sectional view showing the connection of the swinging arm with the rigid connector bar; and Fig. 6 is a detail perspective view of several of the cleaning or scraping fingers.

The attachment constituting this invention comprises a drum supporting frame 1 composed of two rigidly connected open sections 2 and 3, here shown U-shaped, the cross bar 4 of the section 2 being fixedly connected to the free end of the inner arm 5 of the section 3 at a point adjacent the arm 6ª of said section 2. An arcuate bar 7 is connected at one end to the section 3 at the inner end of its arm 5, being preferably made integral with said section, and said bar 7 is connected at its other end with the section 2 at the junction of the arm 6 thereof with its cross bar or base 4, and is shown made integral with said section.

The front ends of the arms 6 and 6ª of the section 2 have upwardly projecting obliquely disposed extensions 8 and 9 which are connected at their free ends by a cross bar 10, said cross bar being preferably made integral with said arm extensions 8 and 9 and the extensions may be integral with the arms 6 and 6ª although they need not be necessarily so formed.

Mounted on the arms of the two sections 2 and 3 are shaft or axle supporting bearings 11, all of which are exactly alike, those on the arms of one section being arranged in alinement with each other as will be understood. These bearings each comprise a casting having a bore 12 extending longitudinally therethrough to receive the end of the axle to be supported and having an adjusting screw 13 arranged in its outer end and designed to contact with the axle end supported in the bearing for locking the axle in operative position to prevent its longitudinal movement, and consequent rattling thereof, a jam nut 13′ being shown for locking the screw. Extending laterally from opposite sides of the casting are two apertured ears or lugs 14 and 15 which are adapted to be bolted to the arms of the sections 2 and 3, said lugs being shown arranged abutting against the lower face of said arms, and the arms are provided with apertured ears 16 extending laterally from the outer edges thereof and through which connecting bolts 17 are passed for securing the bearings to the section arms. Each of these bearings has an oil chamber 18 therein provided with the usual oiling aperture closed by an ordinary spring pressed valve indicated at 19 for preventing the oil from flowing out. By so constructing these bearings, they may be readily detached for cleaning or for substituting others should they become worn or broken.

Mounted in these two sections 2 and 3, are hollow shell-like cylinders or drums 30 and 20 which are constructed as light as possible commensurate with the strain to which they are to be subjected These drums are exactly alike and hence one only will be described in detail. Each of these cylinders has bars 21 extending transversely across the ends thereof through which extend axles as 22 which project through said bars and enter the bearings carried by the arms of the sections in which the cylinders are mounted. Each of these cylinders is provided on its outer face with a plurality of longitudinally spaced annular scraping blades or ribs as 23. These blades, as shown, have upright side walls providing between them annular earth receiving chambers or grooves as 24 which are substantially rectangular in cross section for a purpose to be described.

By so mounting the cylinders 30 and 20 in the U-shaped frame sections 2 and 3, the axes of these cylinders diverge forwardly at an angle of about ten degrees to provide for the free revolution of the cylinders and for sidewise crowding or scraping of the earth during the forward movement of the attachment, as will be hereinafter more fully described.

This supporting frame 1 is designed to be connected with a riding plow and held yieldably in engagement with the earth over which it is to be drawn by means of a connector in the form of a bar 25 which may be of any suitable or desired length according to the distance which it is desired to position the frame at the rear of the plow. This bar 25 is provided at its forward end with an attaching bracket 26 shown formed integral with said bar end and extending laterally from one side thereof. This bracket 26 has spaced apertured ears 27 in which are mounted the ends of U-shaped bolts 28 for connecting the bar to the plow frame. The other end of this bar 25 is provided with a laterally extending arm 29, said bar being shown curved adjacent the connection or base of said arm. This arm 29 when in operative position, depends from the bar 25 at its rear end and is provided with outwardly and laterally extending apertured ears 31 and 32, one of which is arranged at the free end of said arm and the other at the base thereof and which are provided with free bushings 31′ and 32′ through which a bolt 33 is designed to pass for connecting the bar to the frame 1. The bushing 31′ is longer than the ear 31 through which it passes and is held in place by a nut on the bolt 33. The connection of bar 25 to frame 1 is effected by means of two resilient plates or straps 34 and 35 which are overlapped at one end and arranged on the inner face of the lower lug or ear 32 of the arm 29, said overlapping ends being apertured for the passage therethrough of the connecting bolt 33. These straps diverge from their point of connection with the arm 29 and are connected at their free ends with the opposite ends of the cross bar 10 of the frame section 2 as is shown clearly in Figs. 1 and 2.

Mounted on the bolt 33 between the upper ear 31 and the overlapping ends of the straps 34 and 35, is a swinging arm 36, the inner pivoted end of which is provided with laterally spaced registering bearings 37 through which the bolt 33 passes. (See Fig. 5.) This arm 36 is provided at its free rear end with a depending teat or stud 38 having a shoulder 38′ at its inner end, said stud being designed to enter an aperture 39 formed in one end of a heavy flat plate spring 40 which is bowed into substantially U-shaped form and secured at its opposite end to the frame 1 and here shown connected at the junction of the arm 5 of section 3 with the cross bar 4 of section 2. When said arm 36 is so connected, it compresses said bearing which exerts its tension to hold the frame 1 and the cylinders mounted therein in yielding engagement with the earth over which the attachment is being drawn, so that sufficient force will be exerted thereon for crushing and leveling the earth. The engagement of the teat 38 with the spring is at the point of balance so that the arm swings only when the frame 1 swings, its engagement with the spring being fixed so far as any swinging movement is concerned. When it is desired to draw the attachment over the ground without exerting pressure, such for instance as when the machine is being transported from one field to the other, the apertured end of the spring 40 will be disengaged from the arm 36 to lighten the load on the horses. Secured to the cross bar 4 of the section 2 and the cross bar 3ᵃ of the section 3, are a plurality of cleaning fingers 41 which are here shown secured to said bars by bolts 42. These fingers 41 are constructed as shown in detail in Fig. 6, having squared ends which project into the correspondingly shaped grooves or earth receiving chambers 24 formed around the cylinders 20 and 30, and are designed on the turning of the cylinders to force out the earth which has been packed therein by the scraping action exerted by the cylinders in their forward passage, producing a fine mulch which drops down on the surface over which the machine is passing, and thus conserves the moisture contained therein. These fingers are shown in the form of obtuse-angled plates, one of which forms an attaching plate 41ª and is apertured as shown at 41ᵇ to receive the connecting bolts 42. These apertured members of the fingers are disposed on the lower face of the frame section bars to which they are connected, and the other members extend obliquely forward into the grooves 24. By so mounting these fingers the strain exerted thereon by the turning of the roller will be borne by the frame bar, thereby avoiding bending or breakage of the fingers. The attaching plates 41ª of the end fingers have laterally extending bearing or spacing flanges 41ᶜ on their inner edges to prevent them from turning under pressure.

In the use of this attachment when applied to a plow, the drums or cylinders being positioned with their axes diverging toward the front at an angle of about ten degrees, causes the blades 23 to exert a scraping or leveling action on the plowed earth without causing undue friction on the drums and at the same time the chambers or grooves 24 contained in said drums are filled with the earth so scraped, and thus the earth is retained therein until ejected by the scraping fingers 41 which force it out in a pulverized condition, thus cleaning the grooves on each revolution of the drums and forming a mulch which is spread over the surface over which the drums are drawn.

From the above description, it will be obvious that the use of this improved attachment makes it possible in one operation to plow the soil, level it, and mulch it, and greatly lightens the work of the horses, owing to the fact that a solid footing is provided for them which would not be the case if the field had to be gone over a second time. Moreover, by pulverizing and mulching the ground immediately upon the plowing thereof, all of the moisture therein is conserved, which is an object greatly to be sought in many localities.

I claim as my invention:

1. A mulching and leveling attachment for plows comprising a supporting frame, cylinders revolubly mounted therein, a rigid bar connector having means for engagement with a plow frame and a swiveled connection with said supporting frame, and means for exerting a yielding pressure on said supporting frame whereby the cylinders are held in yielding contact with the surface over which they are drawn.

2. A mulching and leveling attachment for plows comprising a supporting frame, cylinders revolubly mounted therein, a rigid bar connector having means for engagement with a plow frame and a swiveled connection with said supporting frame; and coöperating means carried by said connector and supporting frame for exerting a yielding pressure on said frame.

3. A mulching and leveling attachment for plows comprising a supporting frame, cylinders revolubly mounted therein, a rigid bar connector having means for engagement with a plow frame and a swiveled connection with said supporting frame; and coöperating means carried by said connector and supporting frame for exerting a yielding pressure on said frame, said means being detachably connected.

4. A mulching and leveling attachment for plows comprising a supporting frame, cylinders revolubly mounted therein, a rigid bar connector having means for engagement with a plow frame, said bar having a depending arm at its other end provided with longitudinally spaced laterally extending apertured ears, a pivot bolt extending through said ears, an arm pivoted to swing on said bolt between said ears and having a depending stud on its free end, spring metal straps pivotally engaged at one end with said bolt, said straps diverging and connected at their other ends to said supporting frame, and an outwardly bowed plate spring secured at one end to said frame and having an aperture at its free end for detachable engagement by said stud.

5. In a device of the class described, the combination with a supporting frame and a surface engaging member carried thereby; of a rigid connector with which said frame is pivotally connected to swing in a horizontal plane, an arm mounted on the pivot of said frame to swing in a horizontal plane and held against vertical movement, said arm projecting over said frame, and a spring disposed between said arm and frame for exerting a yielding pressure on said frame.

6. In a device of the class described, a rigid connector, a vertical pivot carried thereby, a supporting frame mounted on said pivot to swing in a horizontal plane, an arm pivotally connected at one end with said pivot and held against vertical movement, the other end of said arm extending over said frame, a bowed spring secured at one end to said frame and at its other end to the free overhanging end of said arm, whereby a yielding pressure is exerted on said frame.

7. In a device of the class described, a supporting frame, a surface engaging member carried thereby, a rigid connector having means for fixedly securing it to a plow frame, a vertically yieldable horizontally swinging connection between said frame and connector, and resilient means for exerting a yielding downward pressure on said frame.

8. In a device of the class described, the combination with a supporting frame and a surface engaging member carried thereby; of a rigid connector with which said frame is pivotally connected to swing in a horizontal plane, an arm mounted on the pivot of said frame to swing in a horizontal plane and held against vertical movement, said arm projecting over said frame, and a U-shaped spring having one leg fixed to the said frame and the other leg engaged with said arm at a point directly over its point of connection with the frame at the point of balance of said spring, whereby swinging movement between said arm and spring is prevented, the arm swinging only with the frame.

9. In a device of the class described, a supporting structure, a surface engaging member, a frame therefor connected to swing laterally relative to said structure at the rear thereof, a member projecting from said supporting structure over said frame and having a depending teat with a shoulder at its inner end, and a U-shaped spring having one arm fixed to said frame and its other arm apertured and detachably engaged with said teat.

10. A plow attachment of the class described comprising a supporting frame, pulverizers mounted in said frame, a rigid bar connector having means for engagement with the plow frame, an arm extending laterally from the rear end of said bar, longitudinally spaced apertured ears extending laterally outward from the rear face of said arm, free bushings mounted in the apertures of said ears, the bushing in one ear being longer than the thickness of the ear and projecting beyond the outer face of said ear, a pivot bolt extending through said bushings, an arm pivotally mounted on said bolt, straps connected at one end with said supporting frame and having their other ends lapped and pivotally engaged with said bolt between said arm and the lower apertured ear, and a resilient connection between the free end of said arm and said frame.

In testimony whereof I have hereunto set my hand in presence of two subscribing witnesses.

JOHN RANDALL BLACK.

Witnesses:
JAMES ISAAC NEWTON,
C. P. DEWERP, Jr.

Copies of this patent may be obtained for five cents each, by addressing the "Commissioner of Patents. Washington, D. C."